United States Patent
Thomson

(10) Patent No.: US 10,564,069 B2
(45) Date of Patent: Feb. 18, 2020

(54) METHOD AND DATA PROCESSING DEVICE FOR DETERMINING A SPACING OF ROLLING ELEMENTS

(71) Applicant: Aktiebolaget SKF, Gothenburg (SE)

(72) Inventor: Allan Thomson, Lanark (GB)

(73) Assignee: AKTIEBOLAGET SKF, Gothenburg (SE)

( * ) Notice: Subject to any disclaimer, the term of this patent is extended or adjusted under 35 U.S.C. 154(b) by 443 days.

(21) Appl. No.: 14/879,157

(22) Filed: Oct. 9, 2015

(65) Prior Publication Data
US 2016/0103037 A1    Apr. 14, 2016

(30) Foreign Application Priority Data
Oct. 13, 2014 (GB) .................................. 1418059.0

(51) Int. Cl.
*G01M 13/04* (2019.01)
*G01B 7/14* (2006.01)
*G01M 13/045* (2019.01)

(52) U.S. Cl.
CPC ............... *G01M 13/04* (2013.01); *G01B 7/14* (2013.01); *G01M 13/045* (2013.01)

(58) Field of Classification Search
CPC .................................. G01M 13/04; G01B 7/14
USPC ............................................. 702/158, 33–34
See application file for complete search history.

(56) References Cited

U.S. PATENT DOCUMENTS

| | | | | |
|---|---|---|---|---|
| 4,054,999 A | * | 10/1977 | Harbottle | F16C 19/364 29/407.06 |
| 5,952,587 A | * | 9/1999 | Rhodes | F16C 19/364 73/862.541 |
| 2004/0251916 A1 | * | 12/2004 | Kirzhner | G01B 7/14 324/635 |
| 2008/0234964 A1 | | 9/2008 | Miyasaka et al. | |
| 2009/0289832 A1 | * | 11/2009 | Evers | F01D 21/003 342/109 |
| 2011/0125419 A1 | * | 5/2011 | Bechhoefer | F03D 7/047 702/34 |
| 2012/0020603 A1 | * | 1/2012 | Stubenrauch | F16C 41/008 384/448 |
| 2013/0233081 A1 | | 9/2013 | Zhu | |
| 2013/0322801 A1 | * | 12/2013 | Den Haak | G01L 5/0009 384/448 |
| 2014/0333070 A1 | * | 11/2014 | Van Der Ham | F01D 1/04 290/52 |
| 2016/0187226 A1 | * | 6/2016 | Tsutsui | G01M 13/045 73/593 |

FOREIGN PATENT DOCUMENTS

| | | |
|---|---|---|
| CN | 102410308 A | 4/2012 |
| CN | 103917791 A | 7/2014 |
| RU | 2432560 C1 | 10/2011 |
| WO | 2014090305 A1 | 6/2014 |

* cited by examiner

*Primary Examiner* — Eman A Alkafawi
(74) *Attorney, Agent, or Firm* — Garcia-Zamor Intellectual Property Law, LLC; Ruy Garcia-Zamor; Bryan Peckjian

(57) ABSTRACT

A method for detecting roller spacings in a roller bearing having at least one row of rollers wherein the rollers in the row are held by at least one cage, preferably by a plurality of roller cages. The method uses roller load induced strain signals for determining the roller spacings.

7 Claims, 7 Drawing Sheets

METHOD AND DATA PROCESSING DEVICE FOR DETERMINING A SPACING OF ROLLING ELEMENTS

CROSS REFERENCE TO RELATED APPLICATION

This is a Non-Provisional Patent Application, filed under the Paris Convention, claiming the benefit of Great Britain (GB) Patent Application Number 1418059.0, filed on 13 Oct. 2014, which is incorporated herein by reference in its entirety.

BACKGROUND OF THE INVENTION

Large size bearings e.g. for supporting rotors of wind turbines are generally too large for a single cage to hold the rollers. The bearings are therefore often designed with a plurality of individual roller cages holding e.g. one or two rollers per cage or with numerous cage segments that hold four rollers each. There is by design a nominal clearance to allow for thermal expansions which can be distributed or can accumulate in one location, which is acceptable. However if any cage segment is broken up then the roller spacings can go out with the design minimum and maximum tolerances.

Known methods of assessing the roller spacing or the cage integrity are based on vibration measurements which are not proving very reliable.

On the other hand, it is known to provide bearings with sensors and microcontrollers with the capability to communicate data relating to the operating state of the bearing to the outside using a wireless transmitter.

Due to the design and the nominal clearance, the pattern of spacings between one cycle of the fundamental train frequency with respect to the inner race (FTFi cycle) and the next can vary slightly. Over a few cycles the pattern can look completely different even with adequate and fairly even loading all around the raceway circumference.

Even with healthy cage integrity, the spacing patterns can change from even spacing through one whole FTFi cycle to a few larger accumulated spacings to one large accumulated spacing. Due to the combination of varying spacing patterns and the presence of a section with low or no load around the outer ring, any excessively small or large spacing may shift in and out of the zone where it can be detected so a single measurement is not considered adequate to confirm cage integrity.

SUMMARY OF THE INVENTION

The invention seeks to provide a reliable and simple way to monitor the roller spacing and the cage integrity.

The method of the invention seeks to determine roller spacings (gaps) from Roller Load Induced Strain (RLIS) signals measured by a preferably wireless node on one of the rings of a large size bearing. Microcontrollers in wireless nodes configured to be integrated into or attached to a bearing have very limited computational power. A further object of the invention is therefore to provide a method simple enough to be implemented in the node rather than in a remote server receiving the raw strain signals from the node.

The invention relates to a method for detecting roller spacings in a roller bearing having at least one row of rollers wherein the rollers in said row are held by at least one roller cage, preferably by plurality of roller cages. The same method can also be applied to assessing the integrity of "single cage" and "individual roller cage" bearing designs.

It is proposed that the method uses roller load induced strain signals for determining the roller spacings. The idea of using the strain signals can be implemented in a simple and cost-saving way because pre-existing sensors and data processing means can be used. The inventors have surprisingly found that the strain signals can be a reliable basis for assessing the cage integrity.

The invention is applicable to bearings with any kind of rolling elements including cylindrical, tapered or toroidal rollers as well as balls. The expression "rollers" should therefore be understood in a broad sense here and in the following and include any kind of rolling elements.

In a preferred embodiment of the invention, the method includes the steps of high band-pass filtering the strain signal; determining zero crossings of the high-pass filtered strain signal; determining roller centers as midpoints between adjacent zero crossings of the signals; determining a roller spacing as a difference between adjacent roller centers; and outputting the roller spacings. The high-pass filtering should remove DC offsets and low frequencies far below the ball pass frequency on the race provided with the sensor and may be complemented by a low-pass filter removing high frequency noise. Preferably, the filter is a narrow band band-pass filter passing only a frequency range including the ball pass frequencies expected for the speed ranges for which measurements shall be made. The filter must have a very low distortion (phase-shift) between the corner frequencies.

In comparison with approaches selecting the peak maxima in the strain signal as the roller centers, errors due to double maxima and offset maxima which are often present even in high amplitude ball-pass peaks, can be avoided or at least strongly reduced. Another approach attempted by the inventors was to use the inflection points on either side of the peak to then determine its center but again noise often introduced errors and false detections. As a consequence, the method using the zero crossings of the signal has turned out to be surprisingly reliable.

It is further proposed that the method includes the steps of determining peak heights and peak positions of peaks of the strain signal; determining troughs depths and trough positions of troughs in the strain signal; comparing the peak heights and trough depths with predetermined threshold values respectively; and making use the roller centers associated to adjacent peaks in the step of determining the roller spacing only under the condition that the peak heights of the adjacent peaks and the trough depth between the peaks are above the respective threshold values. In other words, peaks which are not sufficiently high or which are not clearly separated by troughs with a sufficient depth are discarded, i.e. not used for the purpose of determining roller spacings. This leads to a further improvement of the reliability of the method as a result of filtering out unreliable data.

According to a further aspect of the invention, the method further comprises the step of determining the slope of a linear function connecting the zero crossing point and the peak height of the peak following the zero crossing point and discarding the peak for the purpose of determining the roller spacing if the slope falls short of a predetermined minimum slope. This leads to a further improvement of the reliability of the method as a result of filtering out unreliable data. The requirement of a minimum slope can further be applied to the troughs separating the peaks.

It is further proposed that the method comprises the steps of determining and outputting a confidence level for the measurement by comparing the number of successfully determined roller spacings with the number of rollers in the raceway. The outputting of the confidence level enables an improved interpretation and post-processing of the data.

The method may return all of the roller spacings or only the minimum spacing, the maximum spacing, the mean spacing and/or the confidence rating (% of valid roller spacings).

In preferred embodiments of the invention, the method further comprises the step of mapping the roller load induced strain signals from time-dependent signals and signals describing the distance onto angle dependent signals prior to determining the roller spacings, wherein the roller spacings are output in the unit of degrees or other angle units. It was considered that roller spacing values in mm of circumference are not ideal as for the same spacing this distance would change from roller edge to mid roller in the case of tapered roller bearings and therefore could cause confusion between different types of wireless sensors mounted on the surfaces and embedded and acceptable limits. The transformed signal is independent of the diameter and rotation speed and enables comparisons of the measured spacing with the mean spacing per one FTFi cycle, which should equal to 360 divided by the number of roller per raceway. The latter comparison may be part of a measurement quality check.

Further, it is proposed that the method comprises the step of issuing a warning signal if one of the roller spacings is smaller than a minimum spacing or larger than a maximum spacing. Each of the latter criteria indicates the presence of a broken cage.

A further aspect of the invention relates to a data processing device 16 formed e.g. as a microcontroller including a wireless transmitter configured to be attached to a roller bearing, the device including at least one interface for receiving roller load induced strain signals, wherein the data processing device 16 implements the method as described above.

A yet further aspect of the invention relates to a roller bearing equipped with at least one strain sensor 14 for capturing roller load induced strain signals and with a data processing device 16 as described above.

Further aspects of the invention are related to a good quality strain signal which may then be gated for acceptable speed variation, and quality checks of the final and intermediate results to be representative by peak height and trough depth thresholds and mean slopes. Then only those spacings between consecutive valid roller centers are used to determine the roller spacing.

The method is preferably implemented in fixed point calculation with low processing power to be suitable for use in a wireless node. The method can further be implemented using a smart sensor, in acquisition systems with processing capabilities and in a computer. Compared to other techniques, the accuracy reduction due to simplicity of implementation is negligible.

The following non-limiting description of embodiments of the invention as well as the figures shows multiple characterizing features of the invention in specific combinations. The skilled person will easily be able to consider further combinations or sub-combinations of these features in order to adapt the invention as defined in the claims to his or her specific needs.

DETAILED DESCRIPTION OF THE EMBODIMENTS

Figure 1:
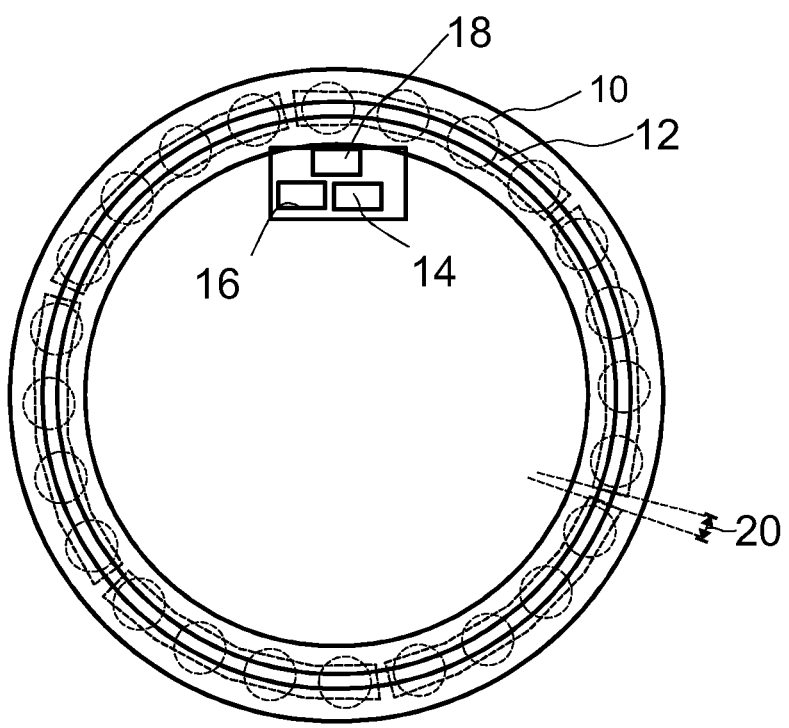
FIG. 1 is a schematic representation a roller bearing including a strain sensor 14 for measuring strains created by passing rollers arranged in a cage and a data processing device 16 according to the invention.

FIG. 1 is a schematic representation of the roller bearing including 24 rollers 10 arranged in 6 cages 12, wherein each of the cages 12 holds four rollers 10. A strain sensor 14 is attached to or embedded into an inner ring of the bearing and connected to the input of a data processing device 16 formed as a microcontroller.

The invention is applicable to configurations with more than one sensor, in particular with three or four sensors arranged on the inner ring or to applications where the sensor 14 is mounted on the outer ring.

The microcontroller is configured to drive a wireless transmitter mounted in the same electronics pack. Preferably, the electronics pack includes a power harvesting means (not illustrated) for generating power from the rotation of the bearing.

The six cages 12 of the bearing are designed so as to be arranged with a predetermined spacing or gap 20 in between each pair of adjacent cages 12. The distribution of the gaps 20 is subject to dynamical changes depending on friction, load, vibrations or other parameters. If the gaps 20 are equally distributed, i.e. when the gaps between each pair of adjacent cages 12 have equal width, the spacing between each pair of adjacent rollers 10 is equal as well and corresponds to a nominal spacing, i.e. the rollers 10 are homogenously distributed over the circumference of the inner ring.

In case where the cages 12 are distributed such that there is only one large gap 20, whereas the other gaps are closed because the cages 12 are in contact with each other, the roller spacing between the rollers 10 left and right from the large gap 20 is larger than the nominal spacing, whereas the roller spacings between neighboring rollers 10 held by different cages 12 contacting each other is smaller than the nominal spacing. The latter extreme cases for the spacings are minimum and maximum spacings for the case of healthy cages 12 which are not broken. The presence of spacings above or below these values indicates that there is a broken cage or broken or missing roller.

According to one aspect of the invention, the spacings, i.e. the distance between the centers of neighboring rollers 10, are detected for the purpose of checking the integrity of the cages 12.

However, the occurrence of very large or very small spacings is a sufficient but not a necessary condition for the existence of a damaged cage 12. Even if the cage 12 is damaged, the rollers 10 may distribute in a perfectly homogeneous way by chance.

The strain sensor 14 is configured to measure strain induced by passing rollers 10. The signal generated by the strain sensors 14 will be called roller load induced strain signal or RLIS signal here and in the following. The signal has basically two characteristic periods or frequencies, one corresponding to the delay between rollers 10 passing by the sensor and the other period corresponding to the time interval in which all of the rollers in a row, i.e. the entire train of rollers and cage segments, will pass the sensor 14. The latter time interval is also referred to as the fundamental train period. Both periods and/or the pertinent frequencies depend on whether the sensor 14 is mounted on the outer ring or on the inner ring.

In order to reliably detect cage integrity, it is necessary to have a signal covering multiple cycles of rotation of the cages 12 with respect to the inner ring. As the cages 12 rotate with roughly half the speed of the outer ring, this means that a signal sample for use in the roller spacing algorithm for checking the cage integrity should include approximately six or more shaft rotations.

Figure 2A:
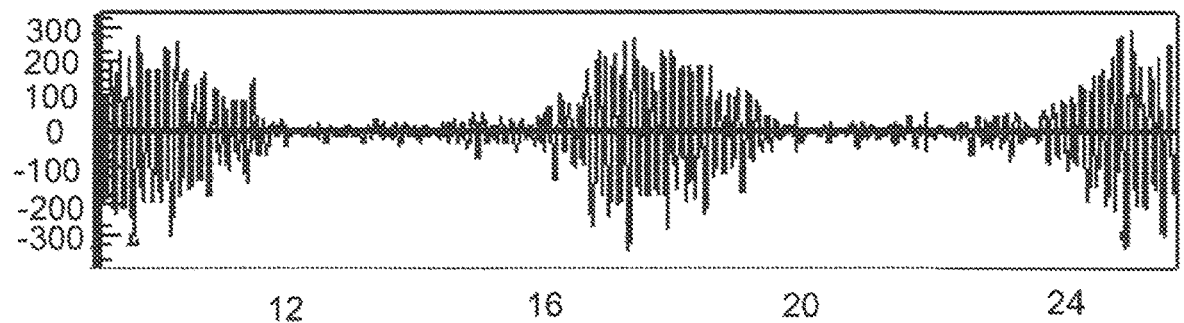
FIGS. 2a and 2b are schematic representations of possible strain signals to be interpreted by the method according to the invention.
Figure 2B:
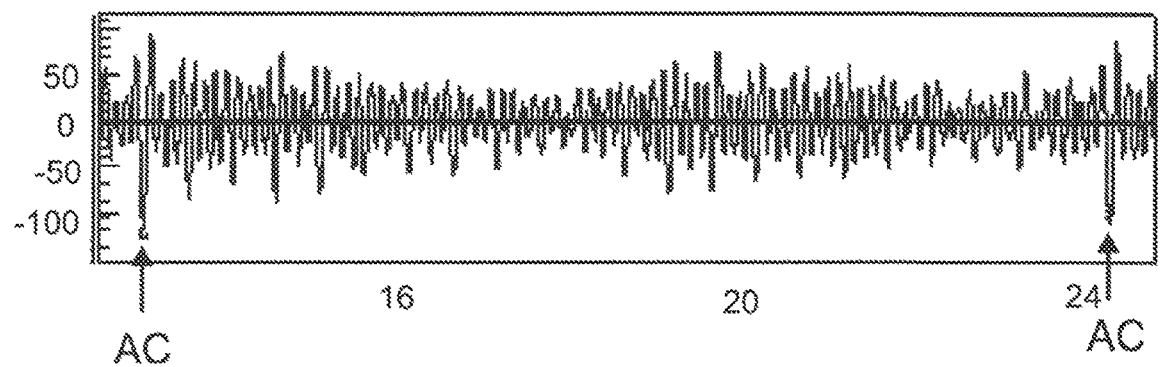

FIGS. 2a and 2b are schematic representations of possible strain signals to be interpreted by the method according to the invention.

The uppermost graph in FIG. 2a shows that the amplitude of the signal may be varying as a consequence of significant load variations.

FIG. 2b illustrates an example with one accumulated clearance AC or gap at a position indicated with an arrow. The spacing between two consecutive peaks of the signal is wider than the spacing between other peaks.

In FIGS. 2a and 2b as well as in the following graphs showing sensor signals, the signal is preprocessed using a band-pass or high pass filter filtering out DC offsets and frequency components far below the roller pass frequency. The band pass filter should be as narrow as possible to avoid distortions but wide enough to include the roller pass frequency and at least some harmonics thereof. This is an important point for the invention because it makes sure that the signal is oscillating in a more or less symmetric way around zero. Further, the horizontal axis in FIGS. 2a and 2b as well as in the following figures is an angle of rotation and the vertical axis represents the signal strength in arbitrary units.

Figure 3A:
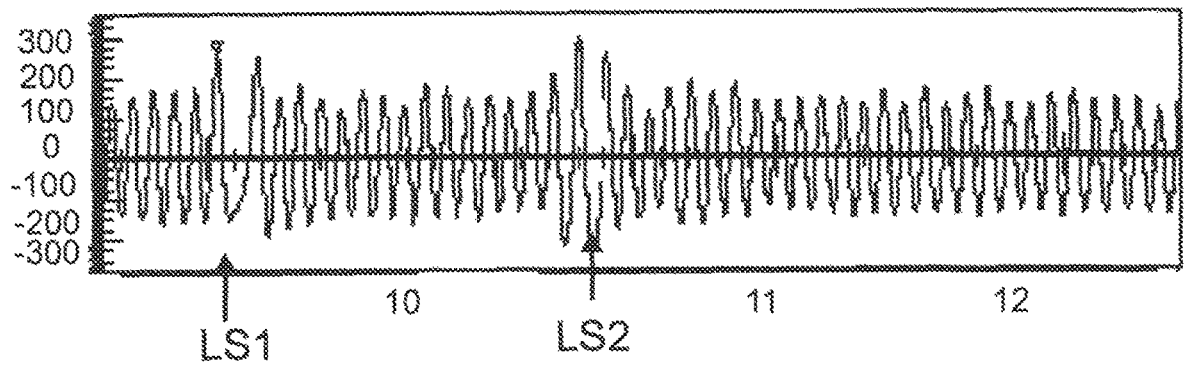
FIGS. 3a and 3b are further schematic representations of graphs showing possible strain signals to be interpreted by the method according to the invention.
Figure 3B:
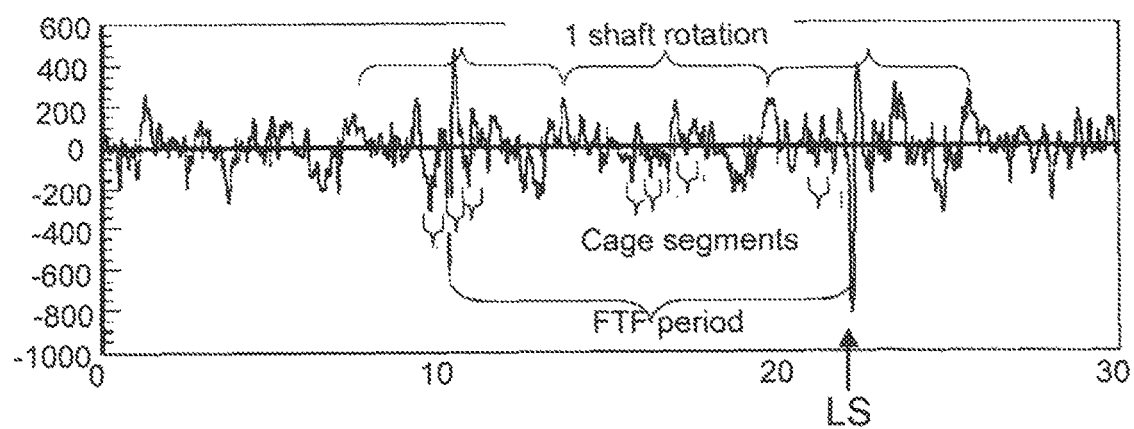

FIGS. 3a-3b are further schematic representations of graphs showing possible strain signals to be interpreted by the method according to the invention.

The signal of FIG. 3a shows a large spacing LS1 due to a missing roller as well as some naturally occurring larger spacings LS2.

FIG. 3b shows a very noisy signal wherein a large accumulated spacing LS exceeding the tolerance for healthy cage integrity can still be observed.

Figure 4A:
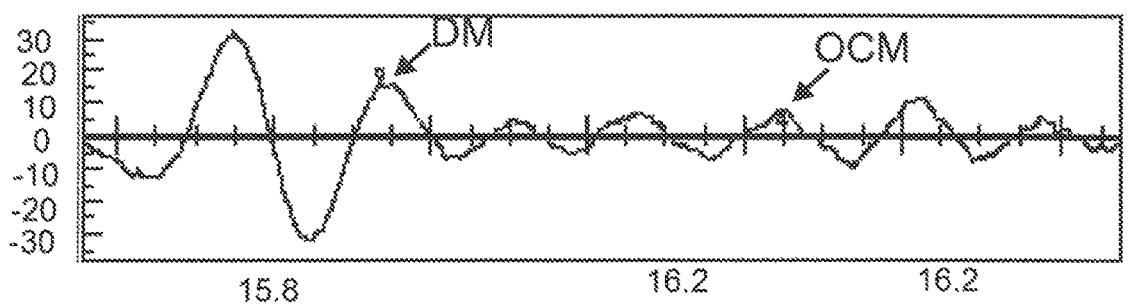
FIGS. 4a and 4b are further schematic representations of graphs showing possible strain signals to be interpreted by the method according to the invention.
Figure 4B:
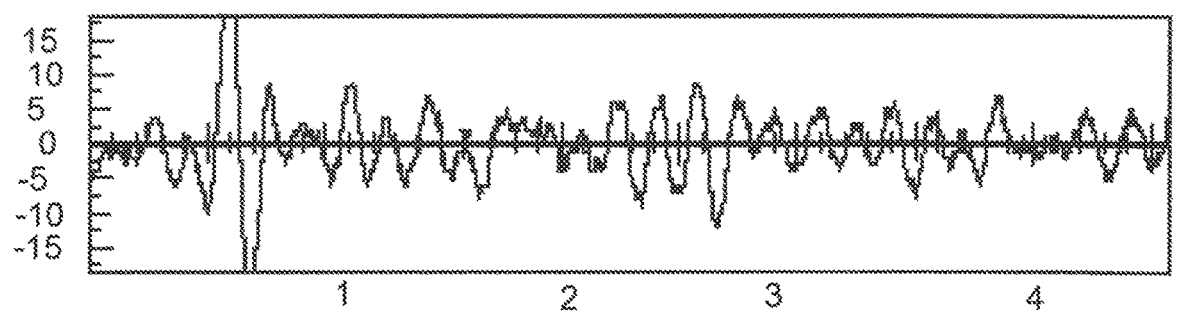

Further schematic representations of graphs showing possible strain signals to be interpreted by the invention are illustrated in FIGS. 4a and 4b. As illustrated in FIG. 4a, the maxima of the strain signals can assume various shapes including double maxima DM and offset center maxima OCM such that it is immediately clear that the position of the maximum is eventually shifted from the position of the roller center.

Further, as shown in FIG. 4b, the signals pertaining to some of the peaks do not cross the zero line, whereas the signals belonging to other peaks cross the zero line several times. This is likely to happen in low roller load conditions or in other cases with high signal-to noise ratio.

One of the challenges of the invention is to provide a method which reliably extracts valuable information from the signals illustrated in FIGS. 2, 3, and 4.

Figure 5:
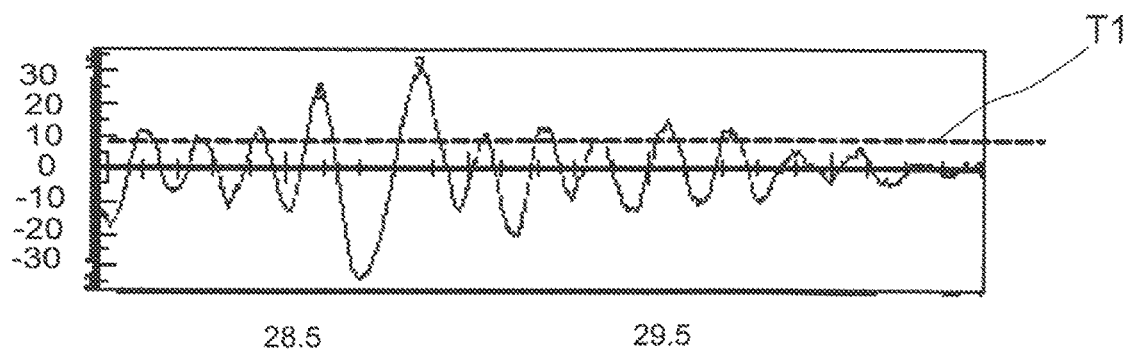
FIG. 5 is a schematic representations of graph showing a strain signal, wherein some zero crossings and peaks are highlighted.

FIG. 5 is a schematic representation of a graph showing a strain signal, wherein some zero crossings Z1-Z4 and peaks P3, P4 are highlighted. The invention proposes to reduce the amount of error by selecting the zero crossings on either side of a ball-pass frequency peak and to determine the roller center to be the midpoint between the two zero crossings.

However, the signal-to-noise ratio increases visibly on the right hand side in FIG. 5 and the evaluation of these peaks for the purpose of determining the roller centers would obviously not lead to reliable results. As a rule, the signal-to-noise ratio in a range between one half of the fundamental ball pass frequency and twice the fundamental ball pass frequency should be above 60%.

The invention therefore proposes to apply a threshold value T1 as illustrated in a dashed line in FIG. 5 to the peak heights and to consider only those peaks valid for which the peak height is above the threshold value T1.

Figure 6A:
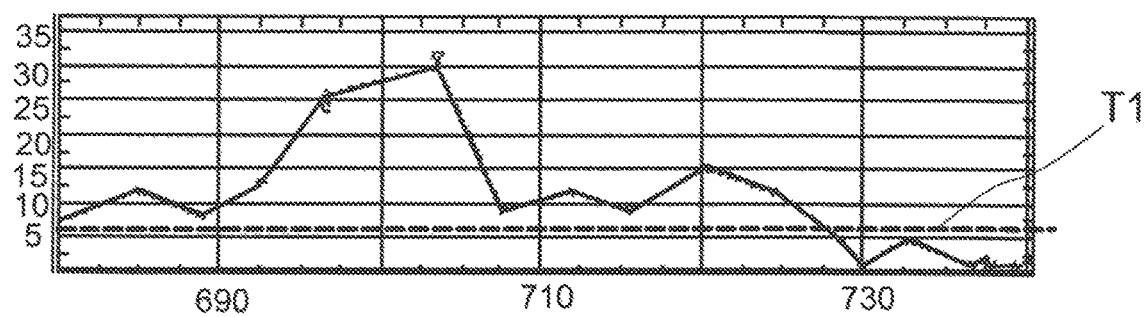
FIGS. 6a and 6b are graphs showing peak centre amplitudes and roller spacings derived from the peak centre amplitudes.
Figure 6B:
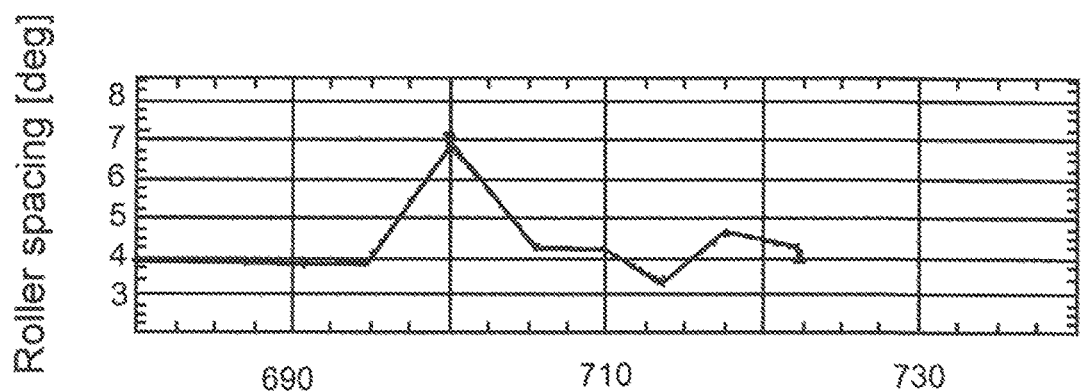

FIG. 6a illustrates the peak center amplitudes, which can be the signal value at the peak position or be computed based on some sort of running average around the previously calculated roller center position and FIG. 6b illustrates a roller spacing calculated based on these peaks. The peaks on the right hand side of the graph fall short of the threshold value and are not used for the calculation of roller spacings in FIG. 6b.

FIG. 6b shows the roller spacings defined as the difference of adjacent valid peak positions derived as explained above from the data of FIG. 6a.

Though not illustrated, a calculation similar to the assessment of the peak heights according to FIG. 6a can be done for the trough depths, i.e. the depth of the negative peaks between each pair of two positive peaks. The invention proposes to apply a threshold value to these trough depths as well and to use only those peaks for the assessment of the roller spacings which are clearly separated by a trough with a sufficient depth. The second criterion makes sure that the slope of the signals is sufficiently steep at the zero crossings so as to avoid peaks with multiple zero crossings.

In most of the cases, suitably chosen threshold values for the peak heights and the trough depths are sufficient to discard peaks that do not cross the zero line at all or where the signal does not go below zero at one side.

Figure 7:
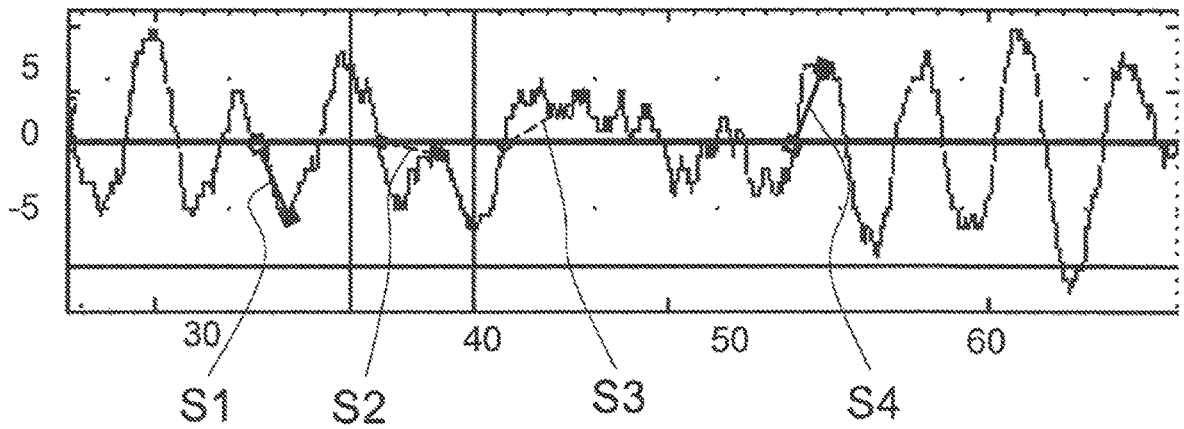
FIG. 7 illustrates a further method for discarding unreliable peak signals.

In order to even more safely avoid that peaks of the last mentioned type are accounted for; the invention proposes a further method for discarding low signal-to noise roller strains which can be applied as an alternative or in addition to the threshold values on the peak height or trough depths. As illustrated in FIG. 7, the absolute slope between a peak maximum and the zero crossing preceding the peak maximum or the slope of a line connecting the center and the preceding zero crossing are calculated and compared against the slope threshold. If the slope does not exceed the threshold, the peak or trough spacings related to the slope are discarded.

Further, the invention teaches to calculate a percentage confidence rating for each roller load induced strain measurement by comparing the number of successfully determined spacings per signal period against the number of rollers 10 per raceway. Where αS1 and αS2 are the FTFi angles of the first and the last successful spacing measurements, as n the number of spacings measured and ZR the number of rollers 10 present then:

Confidence %=(100×360)/($\alpha_{S2}-\alpha_{S1}$)*($S_M$-1)/$Z_R$.

Figure 8:
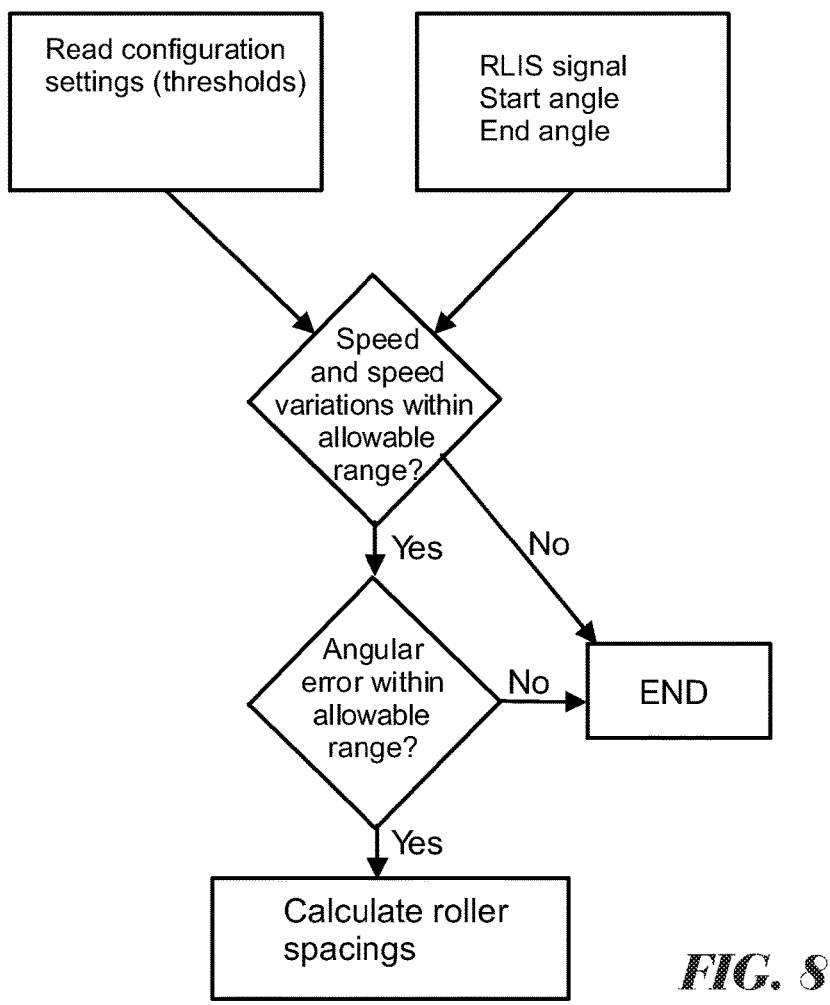
FIG. 8 is a flowchart of a first part of the method according to the invention, wherein a decision whether to carry out the determination of roller spacings.

FIG. 8 provides a flowchart of the decision process whether to carry out roller spacing assessment on a RLIS reading or not. The data processing device receives threshold values for the rotation speed and angle errors as well as the RLIS data including their start angle, end angle, start speed and end speed. It is checked whether the speed is within a certain band, having limited speed change between start and end of acquisition and that speed change is linear during the acquisition (i.e. not a ramp-up and ramp-down scenario).

It is presumed that any latency between the Start Angle measurement and start of acquisition and the end of acquisition and the End Angle measurement has already been compensated for in the node providing the start and end speeds. The data processing device calculates the theoretical end angle using the start angle, the start speed, the end speed and the time span of the RLIS waveform acquisition in seconds presuming a linear speed change and then calculates the difference to the end angle obtained from the node. If the angular error, i.e. the difference between theoretical end angle and actual end angle is greater than a pre-established threshold then the roller spacing algorithm should not be carried out. The raw RLIS signal can either be discarded or stored in the database for future reference.

Figure 9:
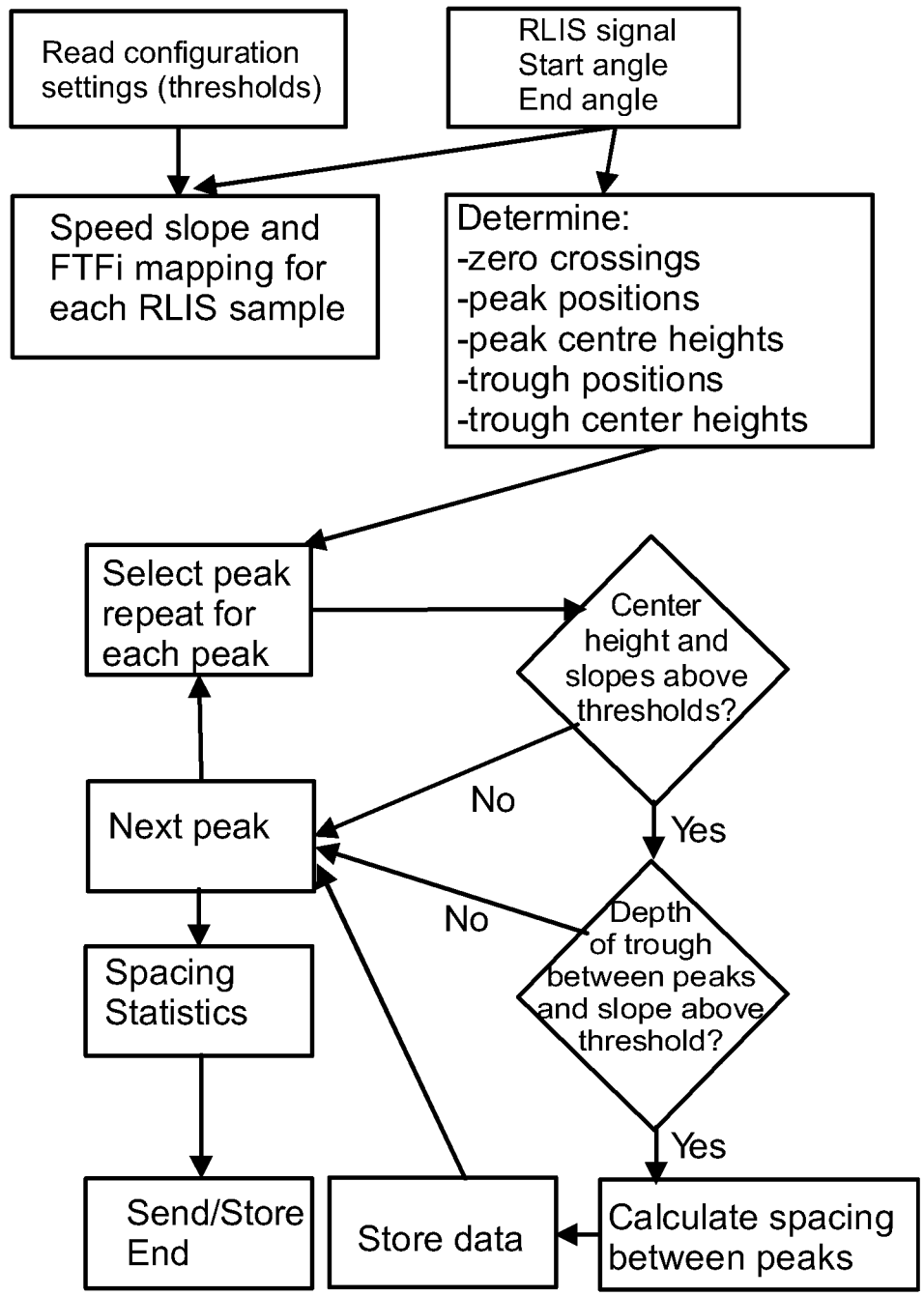
FIG. 9 is a flowchart of the actual roller spacing algorithm according to the invention.

FIG. 9 provides a high level flowchart of the "roller spacing" algorithm. The data and threshold values are input and the data are mapped on the FTFi period presuming a linear speed change as explained above. The zero crossings, peak positions, peak heights, trough positions and trough depths are then determined and stored in arrays respectively.

Then, a loop for checking the validity of each peak is started and it is checked whether the center heights of the peaks and the slopes of straight lines between the peak center and adjacent zero crossings are above the respective threshold values and whether the peaks are separated by a sufficiently deep trough. If two adjacent peaks are judged valid, the roller spacing is calculated as the difference between the peak positions and the roller spacing is stored. Then, the next peak is checked.

Finally, the confidence level is calculated and the spacing statistics are made to determine minimum spacing, maximum spacing, average spacing etc.

Hence the roller spacing algorithm according to the invention is capable of achieving the following advantages: the algorithm may be configured to return any roller spacings values in degrees; it returns the mean spacing value which is also used as a measurement verification as it should be within a margin from 360 divided by the number of rollers assuming skidding and free falling of cages 12 are negligible; the algorithm may be configured to return the maximum spacing value which can be compared against the maximum expected accumulated clearance between rollers 10 or cage segments; it is possible to place a "high alarm" threshold against this value in the monitoring software; the algorithm may be configured to return the minimum spacing value which can be compared against the minimum expected spacing when cage segments are butted up; it is possible to place a "low alarm" threshold against this value in the monitoring software.

The algorithm is further capable of applying a linear speed to degrees mapping from start-speed to end-speed of a measurement and checking that it corresponds to the start angle and end-angle of the same measurement thus eliminating measurements with spacing accuracy compromising speed fluctuations; it is possible to avoid errors when RLIS amplitudes are low enough to be compromised by external or measurement noises eliminate all spacing values between individual RLIS peak values below a pre-established threshold; the algorithm may be configured to return a percentage value representing the fraction of valid spacings per FTFi successfully measured as to provide a confidence factor in the returned spacing values; it enables application engineers to perform an in depth analysis a full statistical study, spacing distribution and histogram based on all the measured spacings can be carried out and displayed appropriately based on the information calculated within this algorithm but not returned in certain embodiments of it.

What is claimed is:

1. A method for detecting roller spacings in a roller bearing having at least one row of rollers held by at least one roller cage, the method executable by a data processing device in communication with at least one strain sensor, the method comprising:
   receiving, by the data processing device, roller load induced strain signals from the at least one strain sensor for determining the roller spacings;
   filtering the roller load induced strain signals via high pass or band-pass filtering to produce a filtered strain signal;
   determining, by the data processing device, the roller spacings by determining zero crossings from the filtered strain signal, adjacent roller centers as midpoints between the zero crossings, and each roller spacing as a difference between the adjacent roller centers;
   determining, by the data processing device, a slope of a linear function connecting a point of the zero crossings and a height of a peak following the point, the peak being discarded when the slope is less than a predetermined minimum slope; and
   issuing, by the data processing device, a warning signal comprising that the least one roller cage is broken or that the rollers are broken or missing, when one of the roller spacings determined from the filtered strain signal and remaining from the discarded peaks is determined to be smaller than a minimum spacing or larger than a maximum spacing, the warning comprising a confidence level for the difference by comparing the number of successfully determined roller spacings with a number of rollers in a raceway, the confidence level being a percentage confidence rating for each of the roller load induced strain signals on a per signal period basis.

2. The method according to claim 1, the method further comprises:
   outputting the roller spacings.

3. The method according to claim 2, the method further comprises:
   a. determining peak heights and peak positions of peaks of the strain signal;
   b. determining trough depths and trough positions of troughs in the strain signal;
   c. comparing the peak heights and trough depths with predetermined threshold values respectively; and d. making use of the roller centers associated to adjacent peaks in the step of determining the roller spacing only under the condition that the peak heights of the adjacent peaks and the trough depth between the peaks are above the respective threshold values.

4. The method according to claim 1, the method further comprising:

mapping at least one of the roller load induced strain signals and from time-dependent signals onto angle dependent signals prior to determining the roller spacings, wherein the roller spacings are output in unit of angles.

5. A data processing device comprising:

a wireless transmitter configured to be attached to a roller bearing having at least one row of rollers held by at least one roller cage, the data processing device including at least one interface for receiving roller load induced strain signals from at least one strain sensor, wherein the data processing device is configured to receive roller load induced strain signals from the at least one strain sensor for determining the roller spacings;

determine the roller spacings by determining zero crossings from a filtered strain signal, adjacent roller centers as midpoints between the zero crossings, and each roller spacing as a difference between the adjacent roller centers;

filter the roller load induced strain signals via high pass or band-pass filtering to produce a filtered strain signal;

determine the roller spacings by determining zero crossings from the filtered strain signal, adjacent roller centers as midpoints between the zero crossings, and each roller spacing as a difference between the adjacent roller centers;

determine a slope of a linear function connecting a point of the zero crossings and a height of a peak following the point, the peak being discarded when the slope is less than a predetermined minimum slope; and issue a warning signal comprising that the least one roller cage is broken or that the rollers are broken or missing, when one of the roller spacings determined from the filtered strain signal and remaining from the discarded peaks is determined to be smaller than a minimum spacing or larger than a maximum spacing, the warning comprising a confidence level for the difference by comparing the number of successfully determined roller spacings with a number of rollers in a raceway, the confidence level being a percentage confidence rating for each of the roller load induced strain signals on a per signal period basis.

6. The data processing device according to claim 5 further comprising:

the at least one strain sensor for capturing the roller load induced strain signal, wherein the data processing device is in signal communication with the at least one strain sensor.

7. A system including:

a roller bearing equipped with at least one strain sensor for capturing roller load induced strain signals, the roller bearing comprising at least one roller cage and at least one row of rollers held by the at least one roller cage; and a data processing device including:

a wireless transmitter configured to be attached to the roller bearing, the data processing device including at least one interface for receiving roller load induced strain signals from the at least one strain sensor, wherein the data processing device is configured to:

receive roller load induced strain signals from the at least one strain sensor for determining the roller spacings;

filter the roller load induced strain signals via high pass or band-pass filtering to produce a filtered strain signal;

determine the roller spacings by determining zero crossings from the filtered strain signal, adjacent roller centers as midpoints between the zero crossings, and each roller spacing as a difference between the adjacent roller centers;

determine a slope of a linear function connecting a point of the zero crossings and a height of a peak following the point, the peak being discarded when the slope is less than a predetermined minimum slope; and issue a warning signal comprising that the least one roller cage is broken or that the rollers are broken or missing, when one of the roller spacings determined from the filtered strain signal and remaining from the discarded peaks is determined to be smaller than a minimum spacing or larger than a maximum spacing, the warning comprising a confidence level for the difference by comparing the number of successfully determined roller spacings with a number of rollers in a raceway, the confidence level being a percentage confidence rating for each of the roller load induced strain signals on a per signal period basis.

* * * * *